(12) United States Patent
Tomiyama

(10) Patent No.: US 10,030,740 B2
(45) Date of Patent: *Jul. 24, 2018

(54) LOCK-UP DEVICE FOR TORQUE CONVERTER

(71) Applicant: EXEDY Corporation, Neyagawa-shi, Osaka (JP)

(72) Inventor: Naoki Tomiyama, Neyagawa (JP)

(73) Assignee: EXEDY CORPORATION, Neyagawa-shi, Osaka (JP)

(*) Notice: Subject to any disclaimer, the term of this patent is extended or adjusted under 35 U.S.C. 154(b) by 95 days.

This patent is subject to a terminal disclaimer.

(21) Appl. No.: 14/894,401

(22) PCT Filed: May 16, 2014

(86) PCT No.: PCT/JP2014/063082
§ 371 (c)(1),
(2) Date: Nov. 27, 2015

(87) PCT Pub. No.: WO2014/196340
PCT Pub. Date: Dec. 11, 2014

(65) Prior Publication Data
US 2016/0116020 A1 Apr. 28, 2016

(30) Foreign Application Priority Data

Jun. 4, 2013 (JP) .................................. 2013-117889
Dec. 17, 2013 (JP) .................................. 2013-259980

(51) Int. Cl.
*F16H 45/02* (2006.01)
*F16F 15/123* (2006.01)
*F16F 15/134* (2006.01)

(52) U.S. Cl.
CPC .......... *F16F 15/134* (2013.01); *F16H 45/02* (2013.01); *F16H 2045/0205* (2013.01);
(Continued)

(58) Field of Classification Search
CPC .............................. F16F 15/134; F16H 45/02; F16H 2045/0284; F16H 2045/0205; F16H 2045/0231; F16H 2045/0263
See application file for complete search history.

(56) References Cited

U.S. PATENT DOCUMENTS 5,020,647 A 6/1991 Fujimoto et al.
9,732,835 B2 * 8/2017 Kawahara ............... F16H 45/02
(Continued)

FOREIGN PATENT DOCUMENTS

CN 1576627 A 2/2005
CN 101487524 A 7/2009
(Continued)

OTHER PUBLICATIONS

Office Action dated Apr. 13, 2017 in U.S. Appl. No. 14/894,344, filed Nov. 26, 2015, 15 pp.
(Continued)

*Primary Examiner* — Ramya P Burgess
*Assistant Examiner* — Lillian T Nguyen
(74) *Attorney, Agent, or Firm* — United IP Counselors, LLC

(57) ABSTRACT

A lock-up device includes an output rotary member rotatable relatively to a clutch portion and coupled to a turbine. A plurality of torque transmission elastic members elastically and rotation-directionally couple the clutch portion and the output rotary member. An intermediate member rotatable relatively to the clutch portion and the output rotary member causes at least two of the plural torque transmission elastic members to act in a series-like manner. A dynamic damper device includes a first inertia ring, a second inertia ring and a plurality of dynamic damper elastic members, the first and second inertia rings axially split and having pairs of accommodation recesses axially opposed to each other, the plural
(Continued)

dynamic damper elastic members accommodated in the pairs of the accommodation recesses of the first and second inertia rings and elastically coupling the intermediate member and the first and second inertia rings.

14 Claims, 11 Drawing Sheets

(52) U.S. Cl.
CPC .............. *F16H 2045/0231* (2013.01); *F16H 2045/0263* (2013.01); *F16H 2045/0284* (2013.01)

(56) References Cited

U.S. PATENT DOCUMENTS

| | | |
|---|---|---|
| 2010/0096788 A1 | 4/2010 | Farahati et al. |
| 2010/0242466 A1 | 9/2010 | Krause et al. |
| 2010/0269497 A1 | 10/2010 | Engelmann et al. |
| 2011/0031083 A1 | 2/2011 | Matsuoka et al. |
| 2011/0099992 A1 | 5/2011 | Magerkurth et al. |
| 2011/0287844 A1 | 11/2011 | Steinberger |
| 2012/0080281 A1 | 4/2012 | Takikawa et al. |
| 2012/0208648 A1 | 8/2012 | Takikawa et al. |
| 2012/0217113 A1 | 8/2012 | Kawahara et al. |
| 2013/0205944 A1 | 8/2013 | Drott |
| 2013/0206529 A1 | 8/2013 | Tomiyama |
| 2013/0225302 A1 | 8/2013 | Kawahara et al. |

FOREIGN PATENT DOCUMENTS

| | | |
|---|---|---|
| CN | 102597567 A | 7/2012 |
| CN | 102893055 A | 1/2013 |
| CN | 103189670 A | 7/2013 |
| DE | 102011101156 A1 | 11/2011 |
| DE | 112009005514 A | 10/2013 |
| JP | 1987185924 | 11/1987 |
| JP | H227238 Y2 | 7/1990 |
| JP | H05288239 A | 11/1993 |
| JP | H10169756 A | 6/1998 |
| JP | H11303940 A | 11/1999 |
| JP | 2001082577 A | 3/2001 |
| JP | 2001330105 A | 11/2001 |
| JP | 2002213567 A | 7/2002 |
| JP | 2005106112 A | 4/2005 |
| JP | 2008038951 A | 2/2008 |
| JP | 2009041662 A | 2/2009 |
| JP | 2009115112 A | 5/2009 |
| JP | 2009293671 A | 12/2009 |
| JP | 2011504986 A | 2/2011 |
| JP | 2011099488 | 5/2011 |
| JP | 2011122621 A | 5/2011 |
| JP | 2011127686 A | 6/2011 |
| JP | 2011185382 A | 9/2011 |
| JP | 4892630 B1 | 3/2012 |
| JP | 2012057694 A | 3/2012 |
| JP | 2012506006 A | 3/2012 |
| JP | 2012077826 A | 4/2012 |
| JP | 2012087856 A | 5/2012 |
| JP | 2012102817 A | 5/2012 |
| JP | 2012122584 A | 6/2012 |
| JP | 2012167755 A | 9/2012 |
| JP | 2012219999 A | 11/2012 |
| JP | 2012251649 A | 12/2012 |
| JP | 2013145025 A | 7/2013 |
| WO | 2010043301 A1 | 4/2010 |
| WO | 2011055622 A1 | 5/2011 |
| WO | 2011138216 A1 | 11/2011 |
| WO | 2012053280 A1 | 4/2012 |
| WO | 2012063586 A1 | 5/2012 |
| WO | 2012169243 A1 | 12/2012 |
| WO | 2013161493 A1 | 10/2013 |

OTHER PUBLICATIONS

Office Action dated Dec. 15, 2016 for U.S. Appl. No. 14/894,344, filed Nov. 26, 2015, 23 pp.
Notification of Reasons for Refusal dated Apr. 21, 2017 for Japanese Application No. 2013-145453, 8 pp.
Office Action dated Oct. 3, 2016 for U.S. Appl. No. 14/903,597, filed Jan. 8, 2016, 8 pp.
Office Action dated Oct. 13, 2016 for Japanese Application No. 2013-145453, filed Jul. 25, 2013, 3 pp.
Decision to Grant Patent dated Oct. 26, 2017 for Japanese Application No. 2013-145453, 6 pp.

* cited by examiner

US 10,030,740 B2

LOCK-UP DEVICE FOR TORQUE CONVERTER

CROSS-REFERENCES TO RELATED APPLICATIONS

This application is the U.S. National Phase of PCT International Application No. PCT/JP2014/063082, filed on May 16, 2014. That application claims priority to Japanese Patent Application No. 2013-117889, filed Jun. 4, 2013, and Japanese Patent Application No. 2013-259980, filed Dec. 17, 2013. The contents of all three applications are herein incorporated by reference in their entirety.

BACKGROUND

Technical Field

The present invention relates to a lock-up device, particularly to a lock-up device for a torque converter, which is disposed between a front cover coupled to an engine-side member and a torque converter body in order to directly transmit a torque from the front cover to a turbine of the torque converter body.

Background Art

A torque converter is embedded with a lock-up device in order to reduce fuel consumption. The lock-up device is disposed between a front cover and a turbine, and is configured to mechanically couple the front cover and the turbine in order to directly transmit a torque therebetween.

In general, the lock-up device includes a piston and a damper mechanism. The piston is pressed onto the front cover by the action of hydraulic pressure, and a torque is transmitted to the piston from the front cover. On the other hand, the damper mechanism includes a plurality of torsion springs, and the piston is elastically coupled to an output-side member coupled to the turbine by the plural torsion springs. In the lock-up device as described above, the torque transmitted to the piston is transmitted to the output-side member through the plural torsion springs, and is further transmitted to the turbine.

Incidentally, Japan Laid-open Patent Application Publication No. 2009-293671 describes a lock-up device that an inertia member is mounted to the output-side member in order to inhibit variation in engine rotation. In the lock-up device described in Japan Laid-open Patent Application Publication No. 2009-293671, the inertia member is mounted to the output member fixed to the turbine so as to be rotatable relatively thereto. Furthermore, torsion springs are mounted as elastic members between the output member and the inertia member.

In the lock-up device of Japan Laid-open Patent Application Publication No. 2009-293671, the inertia member is coupled to the output member through the torsion springs. Therefore, the inertia member and the torsion springs function as a dynamic damper, and these components attenuate variation in rotational speed of the output-side member (turbine).

SUMMARY

In the lock-up device of Japan Laid-open Patent Application Publication No. 2009-293671, the torsion springs, composing a part of the dynamic damper device, are disposed between the piston and the turbine, and as described above, an annular plate member is elastically coupled to the output member through the torsion springs. Furthermore, an inertia ring is fixed to the outer peripheral part of the annular plate.

The construction as described in Japan Laid-open Patent Application Publication No. 2009-293671 results in increase in axial space occupied by the dynamic damper, and also results in increase in weight.

It is an object of the present invention to provide a dynamic damper device that can especially realize a light-weight construction axially occupying a small space.

Solution to Problems

A lock-up device for a torque converter according to an aspect of the present invention is a device that is disposed between a front cover coupled to an engine-side member and a torque converter body and is configured to directly transmit a torque from the front cover to a turbine of the torque converter body, and includes a clutch portion, an output rotary member, a plurality of torque transmission elastic members, an intermediate member and a dynamic damper device. The clutch portion is configured to transmit the torque from the front cover to an output side. The output rotary member is rotatable relatively to the clutch portion, and is coupled to the turbine. The plural torque transmission elastic members elastically and rotation-directionally couple the clutch portion and the output rotary member. The intermediate member is rotatable relatively to the clutch portion and the output rotary member, and causes at least two of the plural torque transmission elastic members to act in a series-like manner. The dynamic damper device includes a first inertia ring, a second inertia ring and a plurality of dynamic damper elastic members. The first and second inertia rings are axially split and have pairs of accommodation recesses axially opposed to each other. The plural dynamic damper elastic members are accommodated in the pairs of the accommodation recesses of the first and second inertia rings, and elastically couple the intermediate member and the inertia rings.

In the present device, when the clutch portion is in a clutch-on state (a power transmitted state), a power from the front cover is inputted into the clutch portion, and is transmitted to a turbine through the plural torque transmission elastic members and the output rotary member. At this time, the intermediate member causes at least two of the plural elastic members to act in a series-like manner. Additionally, the dynamic damper device is mounted to the intermediate member. Variation in rotation can be inhibited by the dynamic damper device.

The dynamic damper elastic members are herein accommodated and disposed in the pairs of accommodation recesses of the inertia rings. Hence, the space occupied by the dynamic damper device can be reduced in comparison with a well-known dynamic damper device. Additionally, it is possible to make the elastic members exert a function of inertia. Hence, increase in weight of the entire torque converter can be inhibited, and variation in rotational speed can be effectively inhibited.

Moreover, the inertia rings are herein axially split, and the elastic members are disposed in the pairs of accommodation recesses formed in the respective inertia rings. Therefore, the elastic members can be easily assembled thereto.

Furthermore, in the present invention, the dynamic damper device is designed to be coupled to the intermediate member, and the torque transmission elastic members are designed to be disposed between the dynamic damper device and the output rotary member. Therefore, even when manufacturing errors and so forth occur in a member composing a part of the dynamic damper device, desired characteristics of absorbing variation in torque can be obtained, and thus, variation in rotation can be effectively inhibited.

In a lock-up device for a torque converter according to another aspect of the present invention, the plural torque transmission elastic members include a plurality of first elastic members and a plurality of second elastic members. The plural first elastic members elastically and rotation-directionally couple the clutch portion and the intermediate member. The plural second elastic members are configured to act with the plural first elastic members in a series-like manner through the intermediate member, and elastically and rotation-directionally couple the intermediate member and the output rotary member.

In a lock-up device for a torque converter according to yet another aspect of the present invention, the plural first elastic members are disposed on an outer peripheral side of the plural second elastic members.

In a lock-up device for a torque converter according to yet another aspect of the present invention, the clutch portion includes a plurality of clutch plates, a piston for pressing the plural clutch plates against each other, and a drive plate coupling the plural clutch plates and the plural torque transmission elastic members. The piston is disposed in opposition to the front cover while the plural clutch plates are interposed therebetween.

In a lock-up device for a torque converter according to yet another aspect of the present invention, an oil chamber forming member is further provided. The oil chamber forming member is disposed on an opposite side of the front cover through the piston, is rotatable in synchronization with the front cover, and forms an oil chamber together with the piston therebetween.

In a lock-up device for a torque converter according to yet another aspect of the present invention, a partition plate is further provided that is disposed on a torque converter body side of the clutch portion so as to be adjacent to the clutch plates.

In a lock-up device for a torque converter according to yet another aspect of the present invention, the oil chamber forming member has a disc shape, and the partition plate is formed by extending an outer periphery of the oil chamber forming member further radially outward.

In a lock-up device for a torque converter according to yet another aspect of the present invention, a float member is further provided that causes at least two of the plural first elastic members to act in a series-like manner.

In a lock-up device for a torque converter according to yet another aspect of the present invention, the plural first elastic members are disposed on an inner peripheral side of the plural second elastic members.

In a lock-up device for a torque converter according to yet another aspect of the present invention, the clutch portion includes a piston disposed between the front cover and the intermediate member so as to be axially movable. The piston has a friction member, which is configured to be press-contacted to the front cover, on an outer peripheral part thereof.

In a lock-up device for a torque converter according to yet another aspect of the present invention, the dynamic damper device further includes a damper plate disposed between the intermediate member and the dynamic damper elastic members. The damper plate is coupled at an inner peripheral part thereof to a part of the intermediate member located radially between the first elastic members and the second elastic members, and has engaging parts, which are engaged with the dynamic damper elastic members, on an outer peripheral part thereof.

According to the present invention as described above, the lock-up device for a torque converter can especially realize a lightweight construction axially occupying a small space. Additionally, according to the present invention, the elastic members can be easily assembled to the inertia rings. Furthermore, according to the present invention, it is possible to actuate the dynamic damper device as effectively as possible by avoiding occurrence of secondary resonance in the dynamic damper device, and it is possible to inhibit variation in rotation and thus especially achieve low fuel consumption.

DETAILED DESCRIPTION OF EMBODIMENTS

First Exemplary Embodiment

Figure 1:
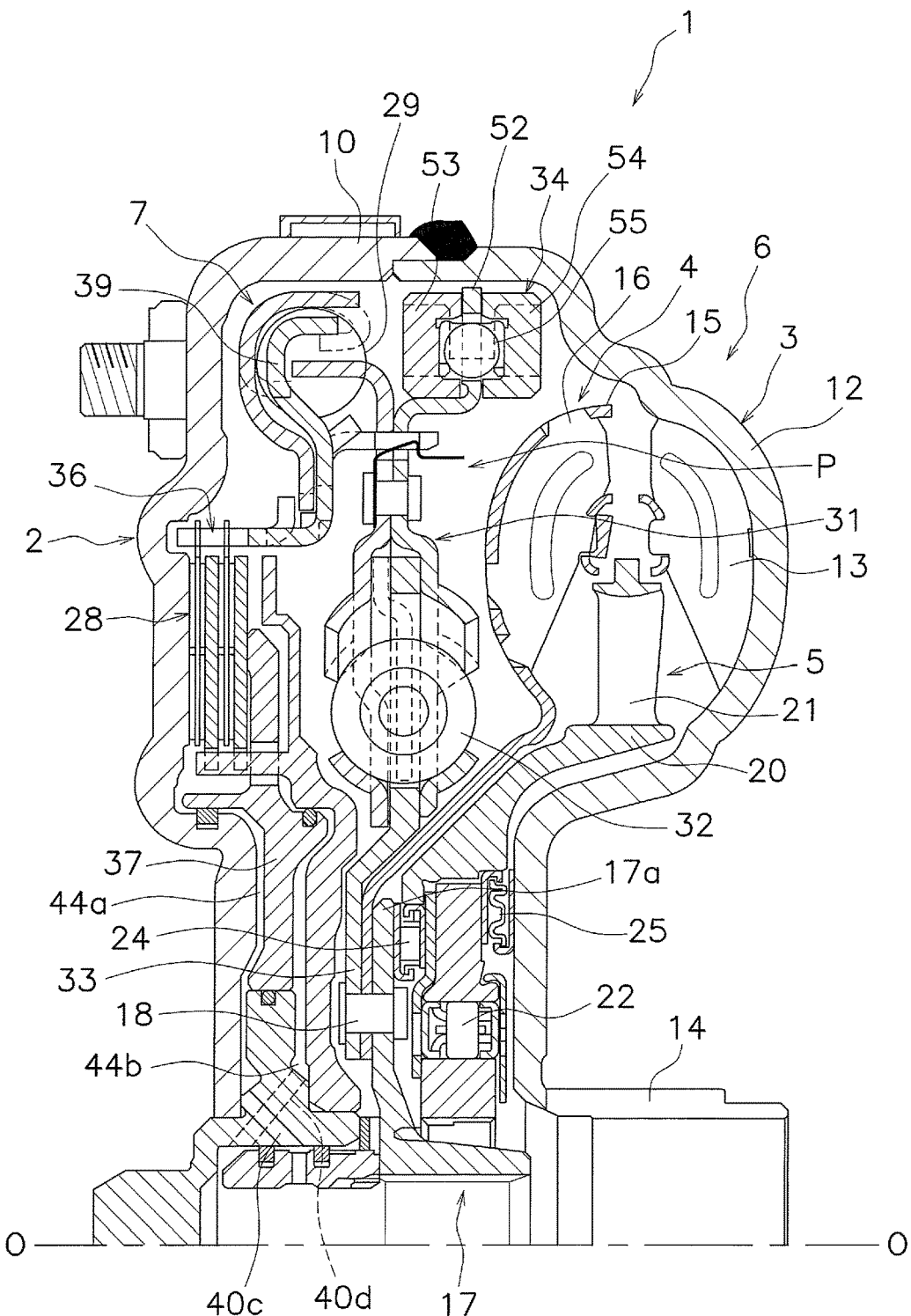
FIG. 1 is a cross-sectional view of a construction of a torque converter equipped with a lock-up device according to a first exemplary embodiment of the present invention.

FIG. 1 is a partial cross-sectional view of a torque converter 1 equipped with a lock-up device according to a first exemplary embodiment of the present invention. In FIG. 1, an engine (not shown in the drawing) is disposed on the left side, whereas a transmission (not shown in the drawing) is disposed on the right side. It should be noted that a line O-O depicted in FIG. 1 indicates a rotational axis of the torque converter and the lock-up device.

[Entire Construction of Torque Converter]

The torque converter 1 is a device for transmitting a torque from an engine-side crankshaft (not shown in the drawings) to an input shaft of the transmission, and includes a front cover 2 fixed to an input-side member, a torque converter body 6 composed of three types of vane wheels (an impeller 3, a turbine 4 and a stator 5), and a lock-up device 7.

The front cover 2 is a disc-shaped member, and an outer peripheral tubular part 10 is formed on the outer peripheral part of the front cover 2 so as to protrude toward the transmission. The impeller 3 is composed of an impeller shell 12 fixed to the outer peripheral tubular part 10 of the front cover 2 by welding, a plurality of impeller blades 13 fixed to the inside of the impeller shell 12, and a tubular impeller hub 14 disposed on the inner peripheral side of the impeller shell 12.

The turbine 4 is disposed within a fluid chamber so as to be opposed to the impeller 3. The turbine 4 is composed of a turbine shell 15, a plurality of turbine blades 16 fixed to the turbine shell 15, and a turbine hub 17 fixed to the inner peripheral part of the turbine shell 15. The turbine hub 17 has a flange 17a extending to the outer peripheral side, and the inner peripheral part of the turbine shell 15 is fixed to the flange 17a by a plurality of rivets 18. Furthermore, the input shaft of the transmission (not shown in the drawings) is spline-coupled to the inner peripheral part of the turbine hub 17.

The stator 5 is a mechanism for regulating the flow of operating oil returning from the turbine 4 to the impeller 3, and is disposed between the inner peripheral part of the impeller 3 and that of the turbine 4. The stator 5 is mainly composed of a stator carrier 20 and a plurality of stator blades 21 mounted to the outer peripheral surface of the stator carrier 20. The stator carrier 20 is supported by a stationary shaft (not shown in the drawings) through a one-way clutch 22. It should be noted that thrust bearings 24 and 25 are mounted on the both sides of the stator carrier 20 in the axial direction.

[Lock-Up Device 7]

Figure 2:
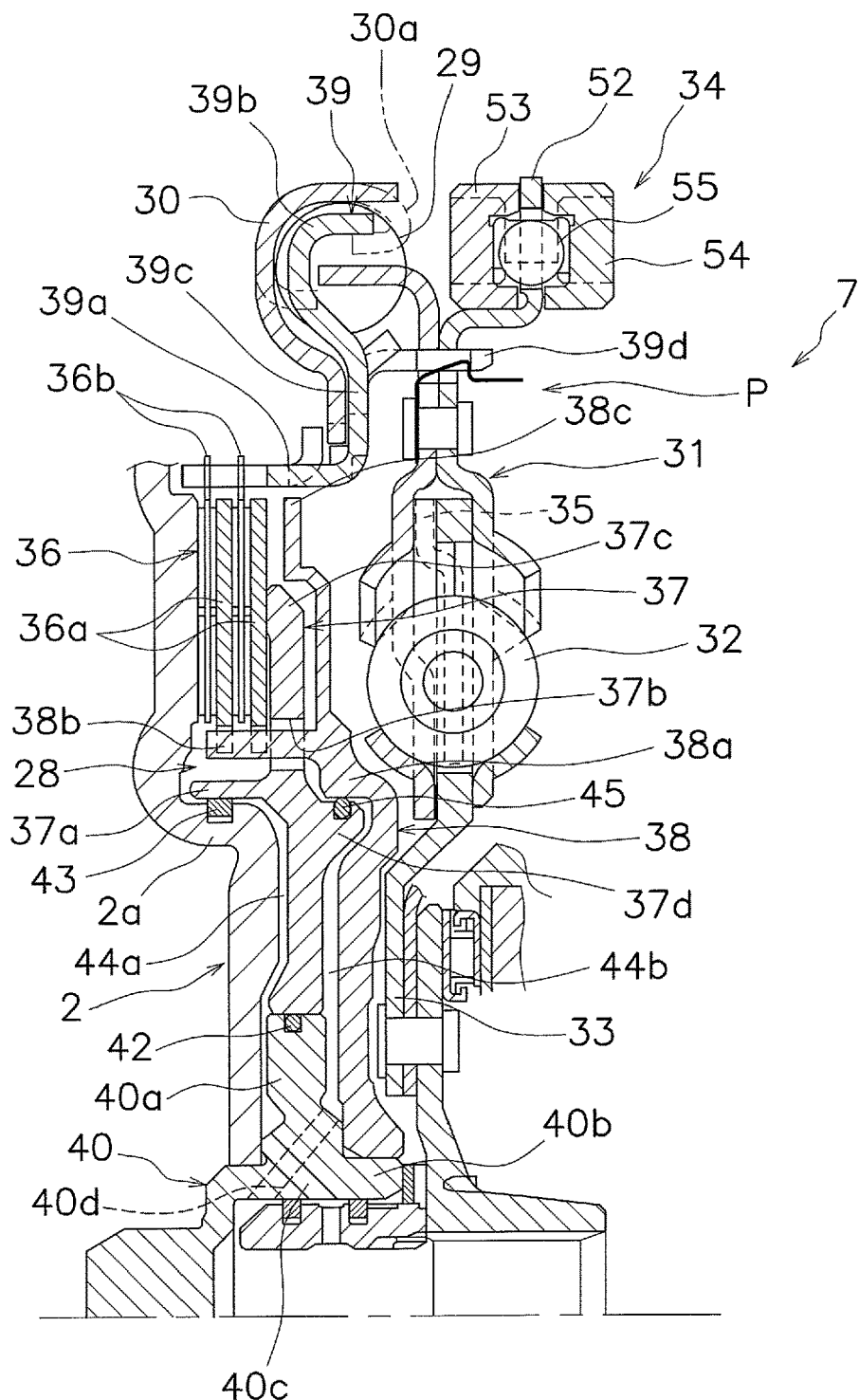
FIG. 2 is a diagram of the lock-up device extracted from FIG. 1.

FIG. 2 shows the lock-up device 7 extracted from FIG. 1. The lock-up device 7 is disposed in an annular space produced between the front cover 2 and the turbine 4. The lock-up device 7 includes a clutch portion 28, outer peripheral side torsion springs (first elastic members) 29, a float member 30, an intermediate member 31, inner peripheral side torsion springs (second elastic members) 32, a driven plate (an output rotary member) 33, a positioning mechanism P, a dynamic damper device 34, and an intermediate component 35.

<Clutch Portion 28>

The clutch portion 28 includes a plurality of clutch plates 36, a piston 37, an oil chamber forming member 38 and a drive plate 39.

—Clutch Plate 36—

The plural clutch plates 36 are disposed between the front cover 2 and the piston 37, and are composed of two first clutch plates 36a and two second clutch plates 36b. Both of the first clutch plates 36a and the second clutch plates 36b have annular shapes, and are disposed so as to be alternately aligned in the axial direction. Each first clutch plate 36a has a plurality of teeth on the inner peripheral part thereof. Each second clutch plate 36b has friction facings fixed to the both faces thereof, and has a plurality of teeth on the outer peripheral part thereof.

—Piston 37—

The piston 37 has an annular shape, and is disposed on the transmission side of the front cover 2. A clutch boss 40 is herein fixed to the inner peripheral part of the front cover 2. The clutch boss 40 has a flange 40a extending radially outward and a cylindrical part 40b axially extending to the turbine side. The inner peripheral surface of the piston 37 is axially movably supported by the outer peripheral surface of the flange 40a of the clutch boss 40. Additionally, a cylindrical part 37a is formed in the radially intermediate part of the piston 37 and protrudes toward the front cover 2. Moreover, the cylindrical part 37a is axially movably supported by a stepped part 2a of the front cover 2. A plurality of openings 37b are formed on the outer peripheral side of the cylindrical part 37a, and are circumferentially aligned at predetermined intervals.

The outer peripheral part of the piston 37 is disposed axially in opposition to the plural clutch plates 36, and serves as a pressing part 37c for pressing the plural clutch plates 36 toward the front cover 2.

—Oil Chamber Forming Member 38—

The oil chamber forming member 38 is disposed on the turbine side of the piston 37. The inner peripheral part of the oil chamber forming member 38 is fixed to the cylindrical part 40b of the clutch boss 40. A stepped part 38a is formed in the radially intermediate part of the oil chamber forming member 38, and forms a cylindrical part extending toward the front cover 2. Additionally, a plurality of protruding parts 38b are formed on the outer peripheral region of the stepped part 38a, and protrude toward the front cover 2. The plural protruding parts 38b are circumferentially aligned at predetermined intervals, and are meshed with the teeth formed on the inner peripheral part of each first clutch plate 36a. Therefore, the first clutch plates 36a and the oil chamber forming member 38 are non-rotatable relatively to each other and are axially movable relatively to each other.

Additionally, an extended part 38c is formed on the outer peripheral part of the oil chamber forming member 38 as a partition plate extending radially outward. The extended part 38c covers the piston 37 and the clutch plates 36 from the turbine side.

—Oil Chamber—

In the construction as described above, a seal member 42 is mounted to the outer peripheral surface of the flange 40a of the clutch boss 40, whereas a seal member 43 is mounted to the stepped part 2a of the front cover 2. These members seal between the clutch boss 40 and the inner peripheral surface of the piston 37 and between the cylindrical part 37a of the piston 37 and the stepped part 2a of the front cover 2, and thereby, a first oil chamber 44a for clutch-off is formed. On the other hand, a seal member 45 is mounted to a protruding part 37d of the piston 37, which is an annular part protruding toward the turbine 4. The member seals between the piston 37 and the oil chamber forming member 38, and thereby, a second oil chamber 44b for clutch-on is formed.

The clutch boss 40 has a first oil path 40c communicating with the first oil chamber 44a and a second oil path 40d communicating with the second oil chamber 44b.

—Drive Plate 39—

The drive plate 39 is disposed on the output side of the clutch portion 28. Specifically, the drive plate 39 is disposed on the outer peripheral side of the clutch plates 36. The drive plate 39 has a clutch engaging part 39a extending toward the front cover 2 and a plurality of spring engaging parts 39b.

The clutch engaging part 39a has a cylindrical shape and has axially extending grooves that are circumferentially aligned at predetermined intervals. Additionally, the grooves are engaged with the teeth formed on the outer peripheral part of each second clutch plate 36b. Therefore, the second clutch plates 36b and the drive plate 39 are non-rotatable relatively to each other and are axially movable relatively to each other.

The plural spring engaging parts 39b extend radially outward from the turbine side of the clutch engaging part 39a, and are engaged with the both end surfaces of the respective outer peripheral side torsion springs 29.

Additionally, a plurality of pawls 39d are formed on a part 39c between the clutch engaging part 39a and the spring engaging parts 39b, and extend to the turbine side. The plural pawls 39*d* are formed by partially cutting and raising the drive plate 39 to the turbine side.

<Outer Peripheral Side Torsion Springs 29 and Float Member 30>

The plural outer peripheral side torsion springs 29 are composed of totally eight springs that are set in pairs, for instance, and the float member 30 is mounted such that two outer peripheral side torsion springs 29 of each pair act in series.

The float member 30 is an annular member having a C-shaped cross section, and is disposed on the outer peripheral side of the clutch engaging part 39*a* of the drive plate 39. The float member 30 is disposed so as to be rotatable relatively to the drive plate 39, supports the outer peripheral parts of the outer peripheral side torsion springs 29 by the outer peripheral part thereof, and supports the engine-side lateral parts of the outer peripheral side torsion springs 29 by the lateral part thereof. Put differently, the float member 30 restricts the outer peripheral side torsion springs 29 from jumping out to the outer peripheral side and the axial engine side. The axial transmission-side tip of the float member 30 is bent to the inner peripheral side and the engine side, and is formed as bent parts 30*a*, each of which is inserted between the outer peripheral side torsion springs 29 of each pair. In other words, each bent part 30*a* is contacted at its both circumferential end surfaces to the end surfaces of its corresponding outer peripheral side torsion springs 29.

As described above, the plural outer peripheral side torsion springs 29 are constructed such that the both circumferential ends of the outer peripheral side torsion springs 29 of each pair are engaged with the spring engaging parts 39*b* of the drive plate 39, and each bent part 30*a* of the float member 30 is inserted into the middle of the outer peripheral side torsion springs 29 of each pair.

<Intermediate Member 31>

Figure 3:
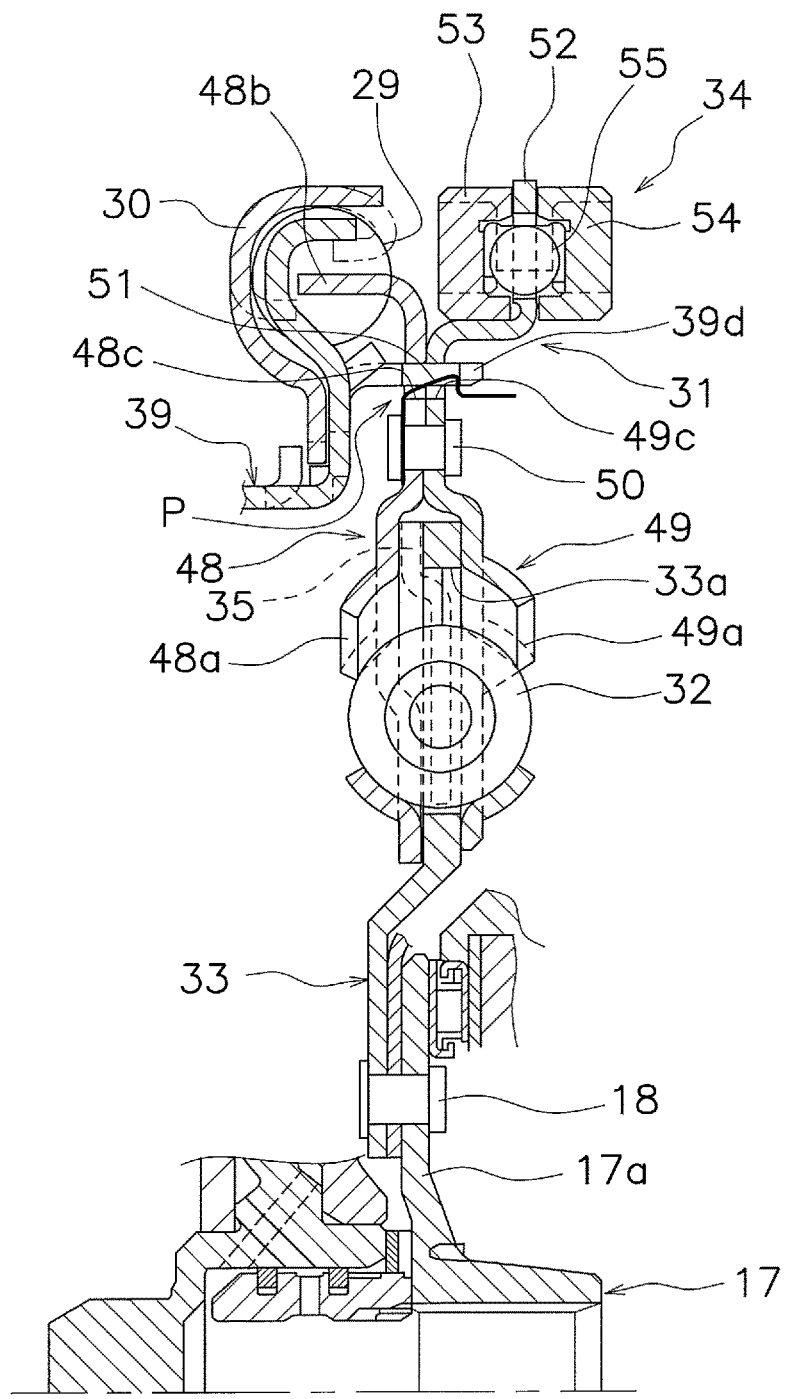
FIG. 3 is a diagram of an intermediate member and a dynamic damper device that are extracted from FIG. 1.

FIG. 3 is a diagram showing the intermediate member 31 and the dynamic damper device 34 extracted from FIG. 1. As shown in FIG. 3, the intermediate member 31 is composed of a first plate 48 and a second plate 49, and is rotatable relatively to the drive plate 39 and the driven plate 33. The first and second plates 48 and 49 are annular disc-shaped members disposed between the clutch portion 28 and the turbine shell 15. The first plate 48 and the second plate 49 are axially disposed at an interval except for the coupled parts thereof. The first plate 48 is disposed on the engine side, whereas the second plate 49 is disposed on the transmission side. The first plate 48 and the second plate 49 are coupled at the outer peripheral parts thereof by a plurality of rivets 50 so as to be non-rotatable relatively to each other and be axially immovable. Each of the first and second plates 48 and 49 has window parts 48*a*, 49*a* axially penetrating therethrough. Each window part 48*a*, 49*a* has a circumferentially extending shape, and has cut-and-raised parts that are formed on the inner and outer peripheral parts thereof so as to be axially cut and raised.

Additionally, a plurality of locking parts 48*b* are formed on the outer peripheral end of the first plate 48 and extend to the outer peripheral side torsion springs 29. The plural locking parts 48*b* are formed by bending the tip of the first plate 48 to the axial engine side. The plural locking parts 48*b* are circumferentially disposed at predetermined intervals, and each pair of the outer peripheral side torsion springs 29 configured to act in series is disposed between two locking parts 48*b*.

The intermediate member 31 as described above enables the outer peripheral side torsion springs 29 and the inner peripheral side torsion springs 32 to act in a series-like manner.

<Inner Peripheral Side Torsion Springs 32>

Each of the plural inner peripheral side torsion springs 32 is made in a combination of a large coil spring and a small coil spring that is inserted into the interior of the large coil spring and has the same spring length as the large coil spring. Each inner peripheral side torsion spring 32 is disposed within each pair of the window parts 48*a* and 49*a* of the both plates 48 and 49 composing the intermediate member 31. Additionally, the both circumferential ends and the inner and outer peripheral parts of each inner peripheral side torsion spring 32 are supported by each pair of the window parts 48*a* and 49*a*. Furthermore, each inner peripheral side torsion spring 32 is restricted from axially jumping out by the cut-and-raised parts of the window parts 48*a* and 49*a* of each pair.

<Driven Plate 33>

The driven plate 33 is an annular disc-shaped member, and the inner peripheral part thereof is fixed together with the turbine shell 15 to the flange 17*a* of the turbine hub 17 by the rivets 18. The driven plate 33 is disposed between the first plate 48 and the second plate 49 so as to be rotatable relatively to the both plates 48 and 49. Additionally, window parts 33*a* are bored in the outer peripheral part of the driven plate 33 so as to be disposed in correspondence with the window parts 48*a* and 49*a* of the first and second plates 48 and 49. The window parts 33*a* are axially penetrating holes, and the inner peripheral side torsion springs 32 are disposed therein.

Figure 4:
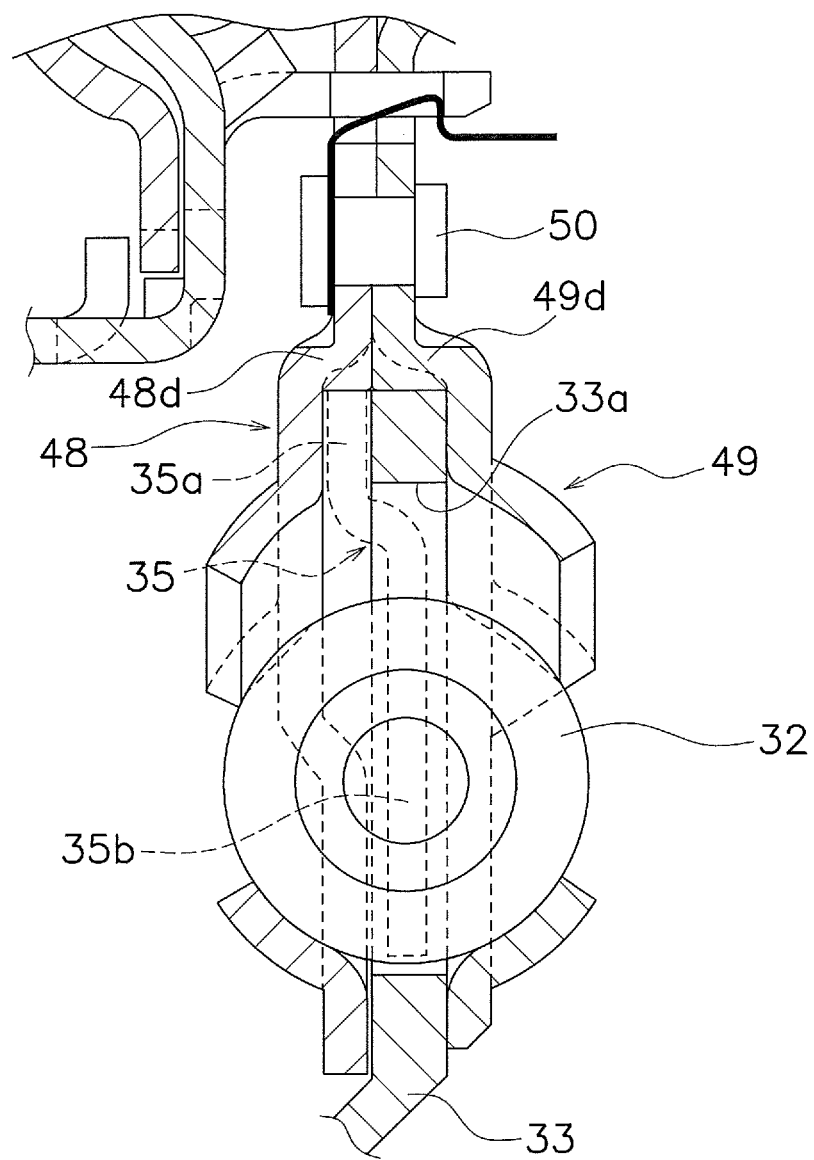
FIG. 4 is a partial enlarged view of FIG. 3.

The driven plate 33 is radially positioned by the second plate 49. Specifically, as shown in FIG. 4, a plurality of positioning parts 49*d* are formed in the outer peripheral part of the second plate 49 so as to be disposed on the inner peripheral side of the part fixed to the first plate 48 by the rivets 50. The positioning parts 49*d* are circumferentially disposed at predetermined intervals, and are formed by stamping a stepped part (a part bent toward the first plate 48), which is formed on the inner peripheral side of the part fixed by the rivets 50, to the further inner peripheral side. Additionally, the outer peripheral surface of the driven plate 33 is contacted to the inner peripheral surfaces of the positioning parts 49*d*, and thereby, the driven plate 33 is radially positioned.

—Intermediate Component 35—

As described above, each of the plural inner peripheral side torsion springs 32 is composed of the large coil spring and the small coil spring. Additionally, two inner peripheral side torsion springs 32 are disposed in each window part 33*a* of the driven plate 33. The intermediate component 35 causes the two inner peripheral side torsion springs 32 to act in series. Put differently, the intermediate component 35 is a component having a function similar to that of the float member 30.

Figure 5:
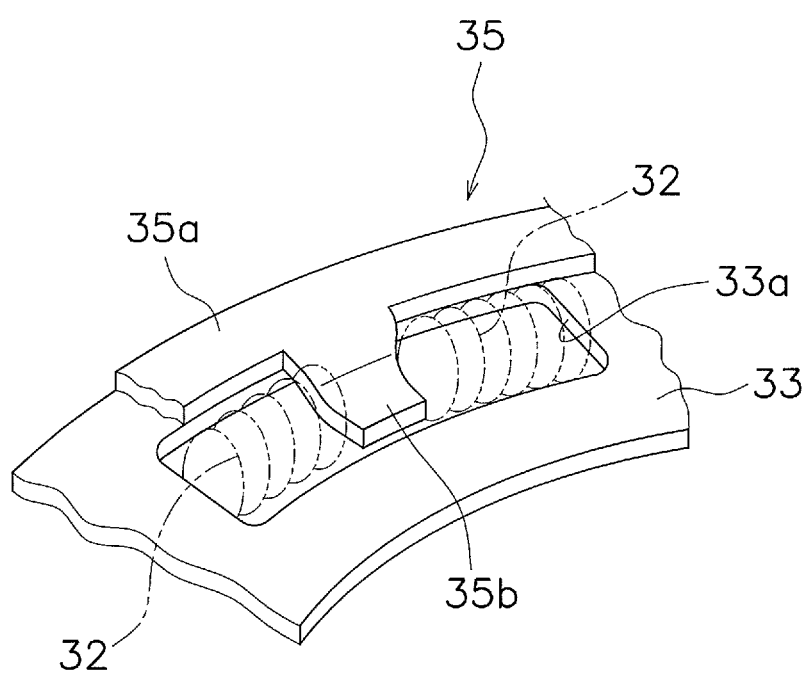
FIG. 5 is a partial perspective view of an intermediate component.

FIGS. 4 and 5 are partial enlarged views of FIG. 3 and show the intermediate component 35. It should be noted that FIG. 5 is a partial view of the intermediate component 35 and the driven plate 33 seen from the first plate 48 side.

As shown in these drawings, the intermediate component 35 has a coupling part 35*a* and a plurality of engaging pawls 35*b*. The coupling part 35*a* has an annular shape, is interposed and held axially between the first plate 48 and the outer peripheral part of the driven plate 33, and is disposed radially on the outer peripheral side of the inner peripheral side torsion springs 32. The plural engaging pawls 35*b* extend from the coupling part 35a to the second plate 49 side and the inner peripheral side, and the inner peripheral tips thereof are respectively disposed in the window parts 33a of the driven plate 33. The plural engaging pawls 35b are circumferentially formed at predetermined intervals, and each is located between two inner peripheral side torsion springs 32 accommodated in each window part 33a of the driven plate 33.

The intermediate component 35 is radially positioned by the first plate 48. Specifically, as shown in FIG. 4, a plurality of positioning parts 48d are formed in the radial intermediate part of the first plate 48 so as to be disposed on the inner peripheral side of the part fixed to the second plate 49 by the rivets 50. The positioning parts 48d are circumferentially disposed at predetermined intervals, and are formed by stamping a stepped part (a part bent toward the second plate 49), which is formed on the inner peripheral side of the part fixed by the rivets 50, to the further inner peripheral side. Additionally, the outer peripheral surface of the intermediate component 35 is contacted to the inner peripheral surfaces of the positioning parts 48d, and thereby, the intermediate component 35 is radially positioned.

<Positioning Mechanism P>

Figure 6:
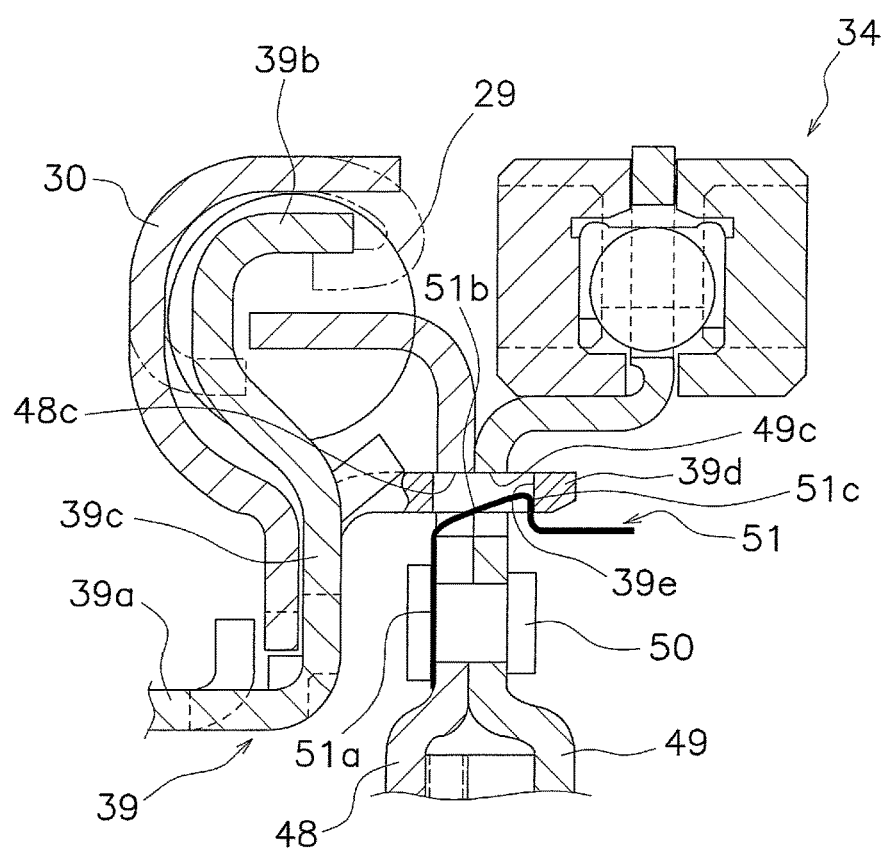
FIG. 6 is a partial enlarged view of FIG. 3.

The positioning mechanism P will be specifically explained with FIG. 6 that is a partial enlarged view of FIG. 3.

As described above, the drive plate 39 has the clutch engaging part 39a and the plural spring engaging parts 39b, and the plural pawls 39d are formed in the part 39c between the clutch engaging part 39a and the spring engaging parts 39b so as to extend to the turbine side.

On the other hand, a plurality of holes 48c, 49c are formed in the outer peripheral part of each of the first and second plates 48 and 49 so as to axially penetrate therethrough. Each of the holes 48c, 49c has a circular-arc shape extending along the circumferential direction. Additionally, each pawl 39d of the drive plate 39 is inserted into each pair of the holes 48c and 49c. Each pawl 39d has a circumferential length shorter than that of each hole 48c, 49c, and thus, gaps are circumferentially produced on the both sides of each pawl 39d. Therefore, with the gaps, the drive plate 39 is rotatable relatively to the first and second plates 48 and 49 by that much. In other words, the pawls 39d of the drive plate 39 are inserted into pairs of the holes 48c and 49c of the first and second plates 48 and 49, and thereby, a range of relative rotational angle between the drive plate 39 and the first and second plates 48 and 49 is restricted.

The outer peripheral surface of each pawl 39d is contacted to the inner peripheral surfaces of each pair of the holes 48c and 49c of the first and second plates 48 and 49. Accordingly, the drive plate 39 having the pawls 39d is radially positioned. In other words, a damper mechanism, composed of the drive plate 39, the plural outer peripheral side torsion springs 29 and the float member 30, is radially positioned with the construction that the pawls 39d of the drive plate 39 are engaged with the pairs of the holes 48c and 49c of the first and second plates 48 and 49.

Additionally, each pawl 39d has a hole 39e radially penetrating therethrough, and a clip 51 is engaged therewith. With the construction, the damper mechanism is axially positioned.

When described in more detail, each clip 51 is a plate-shaped member and has a fixation part 51a and an elastic part 51b. The fixation part 51a is fixed to the front cover-side lateral surface of the first plate 48 by each rivet 50. The elastic part 51b is formed on the outer peripheral side of the fixation part 51a and extends to the turbine side. The elastic part 51b has a protruding part 51c bulging to the outer peripheral side. The protruding part 51c is elastically deformable to the inner peripheral side.

Moreover, axial movement of the drive plate 39 is prevented with the construction that the protruding part 51c is engaged with the hole 39e of each pawl 39d, with the lateral surface of the protruding part 51c being contacted to the inner surface of each hole 39e. In other words, the damper mechanism is axially positioned with the construction that the protruding part 51c of each clip 51 is engaged with the hole 39e of each pawl 39d of the drive plate 39.

<Dynamic Damper Device 34>

As shown in FIGS. 1 to 3, the dynamic damper device 34 includes a damper plate 52 as the outer peripheral extended part of the second plate 49 composing the intermediate member 31, first and second inertia rings 53 and 54, and a plurality of coil springs (dynamic damper elastic members) 55.

Figure 7:
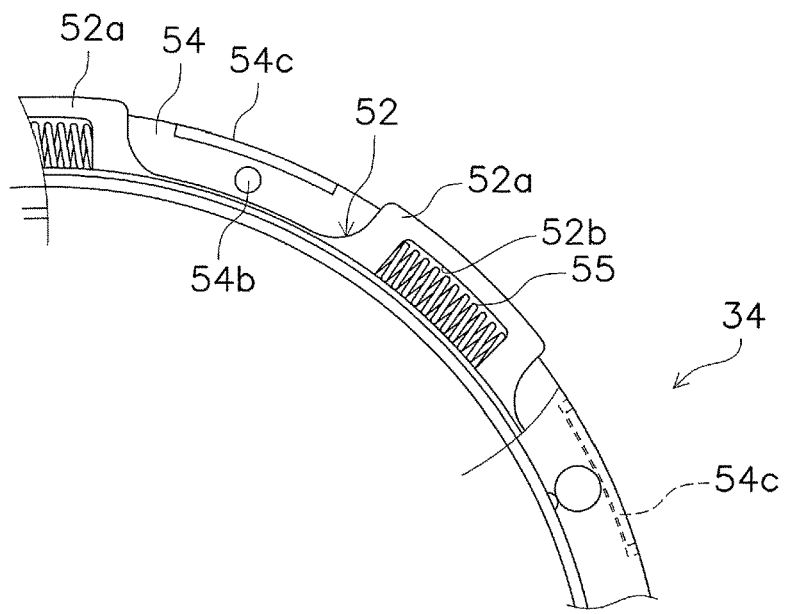
FIG. 7 is a partial front view of the dynamic damper device.

As described above, the damper plate 52 is a part formed by extending the outer periphery of the second plate 49 composing the intermediate member 31, and as shown in FIG. 7, has a plurality of spring accommodating parts 52a that are circumferentially aligned at predetermined intervals. Each spring accommodating part 52a has an opening 52b that is bored so as to have a predetermined length in the circumferential direction.

Figure 8:
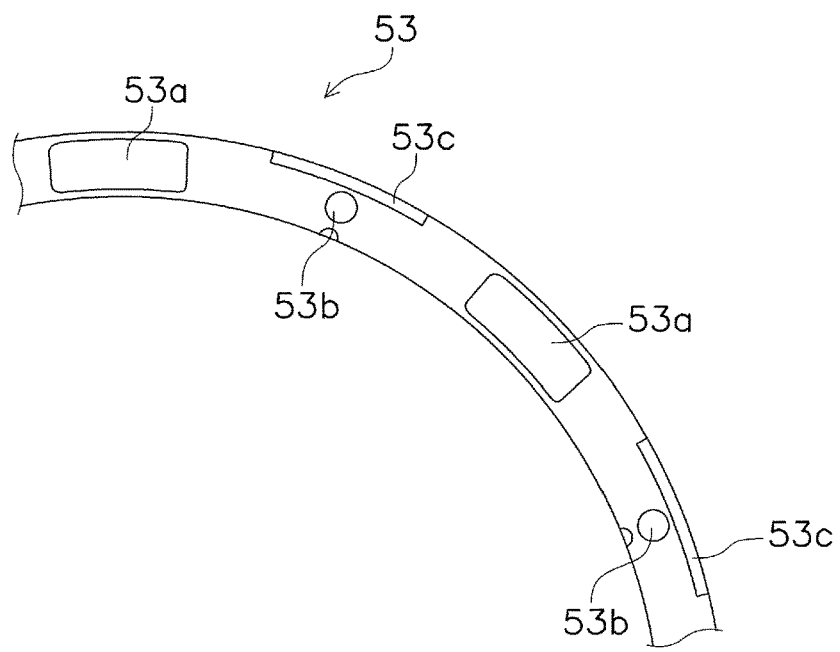
FIG. 8 is a partial front view of a first inertia ring composing a part of the dynamic damper device.
Figure 9:
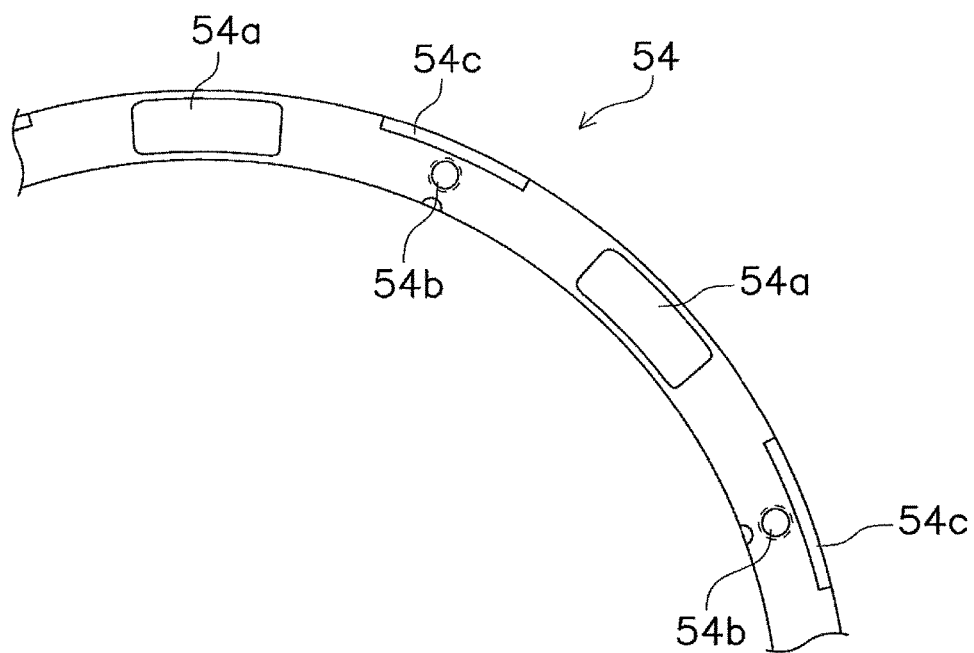
FIG. 9 is a partial front view of a second inertia ring composing a part of the dynamic damper device.

FIG. 8 partially shows the first inertia ring 53, whereas FIG. 9 partially shows the second inertia ring 54.

The first inertia ring 53 has a plurality of recesses 53a that are circumferentially aligned at predetermined intervals. The recesses 53a are formed so as to be recessed toward the engine. Additionally, the circumferential length of each recess 53a is equal to that of each opening 52b of the damper plate 52. An axially penetrating hole 53b and a spigot protrusion 53c are formed circumferentially between adjacent two of the recesses 53a. The holes 53b are the ones through which bolts (not shown in the drawings) for coupling the both inertia rings 53 and 54 penetrate. The spigot protrusions 53c are formed on the outer peripheral side of the holes 53b, and each has a predetermined length in the circumferential direction.

The second inertia ring 54 has a plurality of recesses 54a that are circumferentially formed at predetermined intervals. The recesses 54a are formed so as to be recessed toward the transmission in opposition to the recesses 53a of the first inertia ring 53. The circumferential length of each recess 54a is equal to that of each opening 52b of the damper plate 52. An axially extending screw hole 54b and a spigot recess 54c are formed circumferentially between adjacent two of the recesses 54a. The screw holes 54b are the ones into which the bolts (not shown in the drawings) for coupling the both inertia rings 53 and 54 are screwed. The spigot recesses 54c are formed on the outer peripheral side of the screw holes 54b, and each has a predetermined length in the circumferential direction. Additionally, the spigot protrusions 53c of the first inertia ring 53 are engaged with the spigot recesses 54c.

In a condition that the spigot protrusions 53c of the first inertia ring 53 are engaged with the spigot recesses 54c of the second inertia ring 54, a predetermined axial gap is produced circumferentially between adjacent two of the pairs of the spigot protrusion 53c and the spigot recess 54c, i.e., in a predetermined angular range including a region in which the recesses 53a and 54a are formed. Each spring accommodating part 52a of the damper plate 52 is inserted into the gap. Additionally, each spring accommodating part 52a of the damper plate 52 is rotatable relatively to the both inertia rings 53 and 54 in the predetermined angular range while being inserted in the gap between the both inertia rings 53 and 54.

The plural coil springs 55 are respectively accommodated in accommodation spaces produced by the recesses 53a and 54a of the both inertia rings 53 and 54, and are also accommodated in the openings 52b of the spring accommodating parts 52a of the damper plate 52.

[Action]

First, an action of the torque converter body will be briefly explained. During rotation of the front cover 2 and the impeller 3, the operating oil flows from the impeller 3 to the turbine 4, and a torque is transmitted from the impeller 3 to the turbine 4 through the operating oil. The torque, transmitted to the turbine 4, is transmitted to the input shaft (not shown in the drawings) of the transmission through the turbine hub 17.

When the speed ratio of the torque converter 1 increases and the rotational speed of the input shaft reaches a predetermined speed, the operating oil in the first oil chamber 44a is drained through the first oil path 40c, whereas the operating oil is supplied to the second oil chamber 44b through the second oil path 40d. Accordingly, the piston 37 is moved toward the front cover 2. As a result, the pressing part 37c of the piston 37 presses the clutch plates 36 toward the front cover 2, and the clutch portion 28 is turned into a clutch-on state.

In the clutch-on state as described above, the torque is transmitted through a path composed of the clutch plates 36, the drive plate 39, the outer peripheral side torsion springs 29, the intermediate member 31, the inner peripheral side torsion springs 32 and the driven plate 33 in this order, and is then outputted to the turbine hub 17.

In the lock-up device 7, the torque is transmitted, and also, variation in torque inputted thereto from the front cover 2 is absorbed and attenuated. Specifically, when torsional vibration occurs in the lock-up device 7, the outer peripheral side torsion springs 29 and the inner peripheral side torsion springs 32 are compressed in series between the drive plate 39 and the driven plate 33. Furthermore, similarly regarding the outer peripheral side torsion springs 29, the outer peripheral side torsion springs 29 of each pair are compressed in series. Due to this, a torsion angle can be widened. Additionally, in particular, the outer peripheral side torsion springs 29, each of which can be circumferentially laid at a long distance, are configured to act in series. Hence, the torsion angle can be reliably widened as much as possible. This means that stiffness can be lowered as much as possible in torsional characteristics, and vibration absorption and attenuation performance can be enhanced as much as possible.

[Action of Dynamic Damper Device]

The torque transmitted to the intermediate member 31 is transmitted to the driven plate 33 through the inner outer peripheral side torsion springs 32, and is further transmitted to a transmission-side member through the turbine hub 17. At this time, the dynamic damper device 34 is mounted to the intermediate member 31. Hence, variation in rotation of the engine can be effectively inhibited. Put differently, the rotation of the damper plate 52 and that of the two inertia rings 53 and 54 are displaced in phase by the action of the coil springs 55. Specifically, at a predetermined engine rotational speed, the rotational speed of the inertia rings 53 and 54 varies with a phase that cancels out variation in rotational speed of the damper plate 52. Variation in rotational speed of the transmission can be absorbed by the phase displacement.

Figure 10:
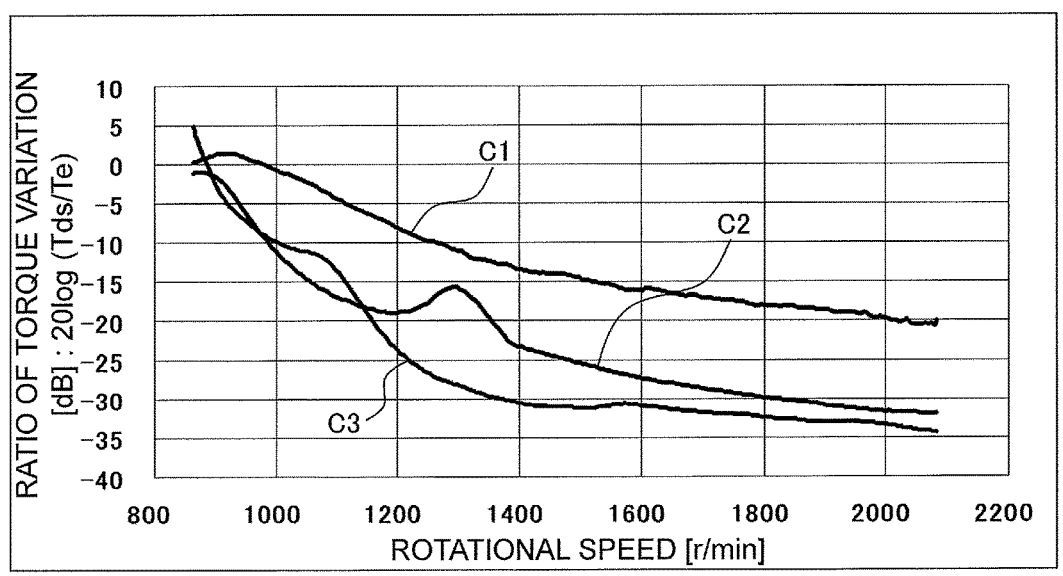
FIG. 10 is a characteristic diagram of engine rotational speed and variation in rotational speed.

Additionally, in the present exemplary embodiment, the dynamic damper device 34 is fixed to the intermediate member 31, and the inner peripheral side torsion springs 32 for inhibiting vibration are disposed between the dynamic damper device 34 and the turbine hub 17. As shown in FIG. 10, variation in rotation can be more effectively inhibited by the action of the inner peripheral side torsion springs 32. In FIG. 10, a characteristic C1 indicates variation in engine rotation. A characteristic C2 indicates variation in engine rotation to be caused when the dynamic damper device is mounted to the turbine hub and no elastic member (torsion spring) is mounted on the output side of the dynamic damper device. On the other hand, a characteristic C3 indicates variation in engine rotation to be caused when, as with the present exemplary embodiment, the dynamic damper device is mounted to the intermediate member and the elastic members (the inner peripheral side torsion springs 32) are mounted on the output side of the dynamic damper device.

As is obvious from comparison between the characteristics C2 and C3 in FIG. 10, when the elastic members are mounted on the output side of the dynamic damper device, the peak of variation in rotation is lowered, and variation in rotation can be also inhibited even in a normal range of the engine rotational speed.

[Features]

(1) The coil springs 55 are accommodated in the interior of the inertia rings 53 and 54. Hence, in particular, the axial space occupied by the dynamic damper device can be compacted. Additionally, it is possible to make these members exert a function of inertia, and the weight of the entire torque converter can be reduced.

(2) The inertia rings are axially split. Hence, the damper plate 52 can be easily inserted therein, and the coil springs 55 can be easily assembled thereto.

(3) The dynamic damper device 34 is mounted to the intermediate member 31, and the inner peripheral side torsion springs 32 are mounted on the output side of the dynamic damper device 34. Hence, variation in rotation can be inhibited as effectively as possible.

(4) The damper mechanism, including the drive plate 39 and so forth, is radially positioned by causing the first plate 48 and the pawls 39d composing a part of the drive plate 39 to be engaged. Hence, positioning can be achieved with a simple construction. Additionally, relative difference in rotational speed between the pawls 39d and the first plate 48 is relatively small. Hence, abrasion can be inhibited in the positioning-related parts.

(5) The damper mechanism is axially positioned by causing the clips 51 to be engaged with the holes 39e of the pawls 39d of the drive plate 39. Hence, positioning can be achieved with a more simple construction in addition to the aforementioned construction.

(6) The elastic parts 51b of the clips 51 are elastically engaged with the holes 39e of the pawls 39d. Hence, the construction makes an assembling work easy.

(7) As to the intermediate component 35 for causing the inner peripheral side torsion springs 32 to act in series, the coupling part 35a is disposed in the gap between the first plate 48 and the driven plate 33. Hence, the construction eliminates necessity of a wide space for the intermediate component 35.

(8) The intermediate component 35 and the driven plate 33 are radially positioned by the first plate 48 and the second plate 49.

Hence, the positioning construction can be simplified as much as possible.

Second Exemplary Embodiment

Figure 11:
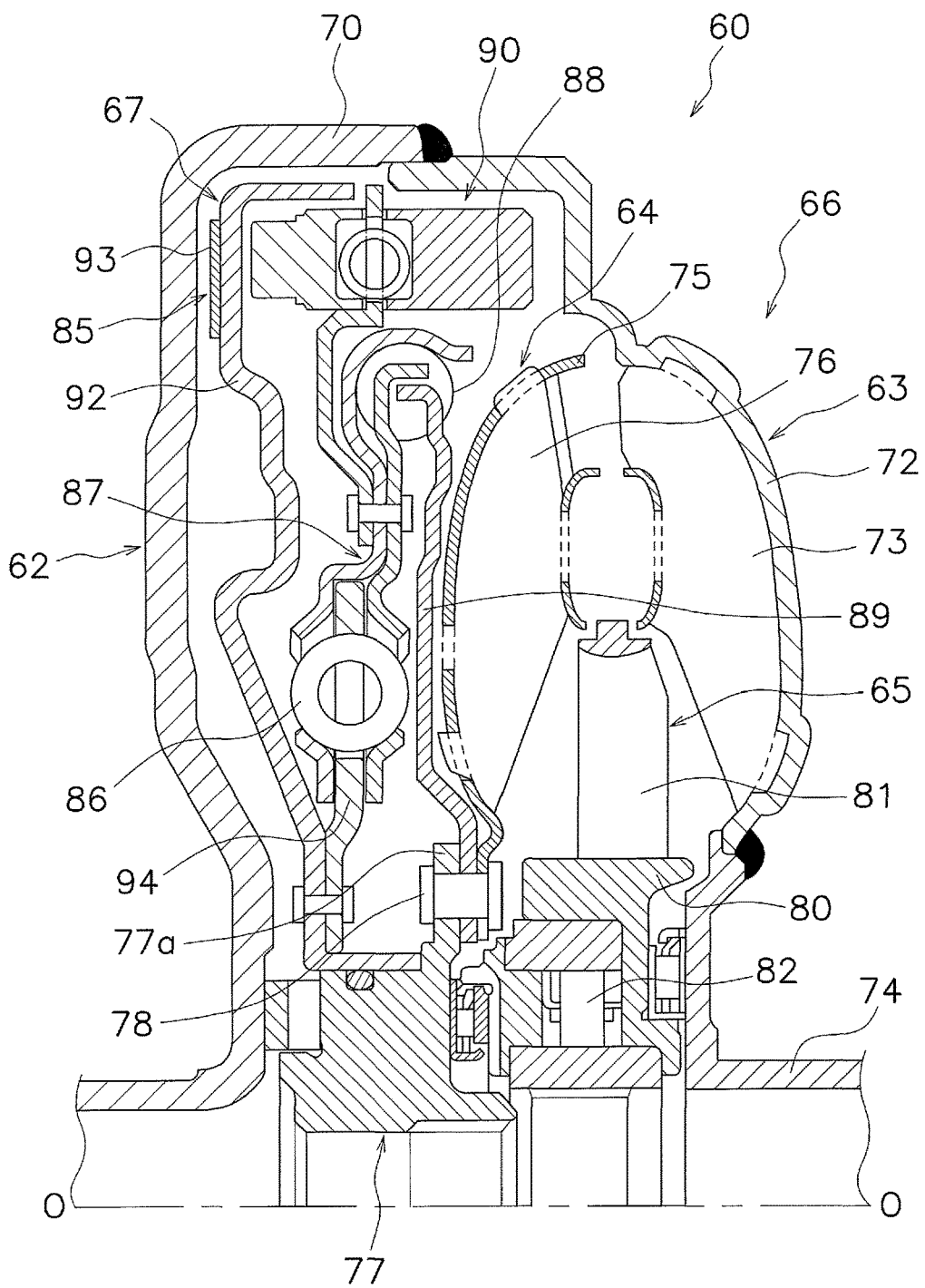
FIG. 11 is a diagram according to a second exemplary embodiment of the present invention and corresponds to FIG. 1.

FIG. 11 shows a partial cross-sectional view of a torque converter 60 equipped with a lock-up device according to a second exemplary embodiment of the present invention. In FIG. 11, similarly to the first exemplary embodiment, an engine is disposed on the left side, whereas a transmission is disposed on the right side. Additionally, a line O-O depicted in FIG. 11 indicates a rotational axis of the torque converter and the lock-up device.

[Entire Construction of Torque Converter]

The torque converter 60 has s basic construction similar to that of the first exemplary embodiment, and includes a front cover 62, a torque converter body 66 composed of three types of vane wheels (an impeller 63, a turbine 64 and a stator 65), and a lock-up device 67.

Moreover, the front cover 62 and the torque converter body 66 are also constructed similarly to those of the first exemplary embodiment. In short, the front cover 62 is a disc-shaped member, and an outer peripheral tubular part 70 is formed on the outer peripheral part of the front cover 62. The impeller 63 is composed of an impeller shell 72, a plurality of impeller blades 73, and an impeller hub 74. The turbine 64 is composed of a turbine shell 75, a plurality of turbine blades 76, and a turbine hub 77. The turbine hub 77 has a flange 77a to which the inner peripheral part of the turbine shell 75 is fixed by a plurality of rivets 78. An input shaft of the transmission is spline-coupled to the inner peripheral part of the turbine hub 77. The stator 65 is composed of a stator carrier 80 and a plurality of stator blades 81. The stator carrier 80 is supported by a stationary shaft (not shown in the drawings) through a one-way clutch 82.

[Lock-Up Device 67]

Figure 12:
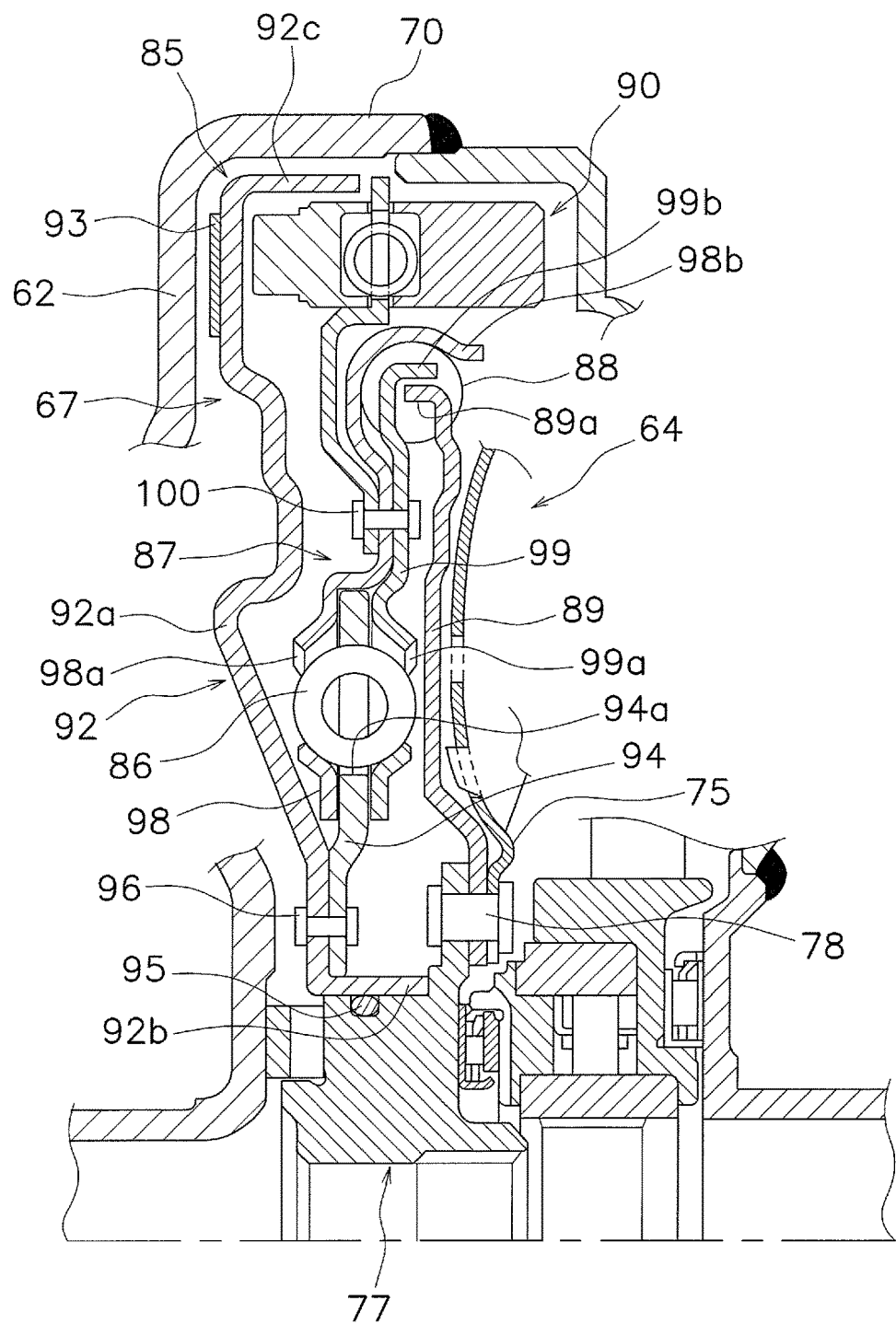
FIG. 12 is a diagram of a lock-up device extracted from FIG. 11.

FIG. 12 shows the lock-up device 67 extracted from FIG. 11. The lock-up device 67 is disposed in an annular space produced between the front cover 62 and the turbine 64. The lock-up device 67 includes a clutch portion 85, a drive plate 94, a plurality of inner peripheral side torsion springs 86, an intermediate member 87, a plurality of outer peripheral side torsion springs 88, a driven plate (an output rotary member) 89 and a dynamic damper device 90.

<Clutch Portion 85>

The clutch portion 85 is disposed in opposition to the front cover 62 so as to be axially movable, and a torque from the front cover 62 is inputted thereto. The clutch portion 85 includes a piston 92 and a friction member 93.

The piston 92 has an annular shape and has a disc part 92a, an inner peripheral tubular part 92b and an outer peripheral tubular part 92c. The disc part 92a is disposed in opposition to the front cover 62. The inner peripheral tubular part 92b axially extends and is formed by bending the inner peripheral region of the disc part 92a toward the transmission. Additionally, the inner peripheral tubular part 92b is supported by the outer peripheral surface of the turbine hub 77 so as to be axially movable. The outer peripheral tubular part 92c axially extends and is formed by bending the outer peripheral region of the disc part 92a toward the transmission. The outer peripheral tubular part 92c is located on the inner peripheral side of the outer peripheral tubular part 70 of the front cover 62.

It should be noted that a seal member 95 is mounted onto the outer peripheral surface of the turbine hub 77, and thus, seals between the inner peripheral tubular part 92b of the piston 92 and the outer peripheral surface of the turbine hub 77.

The friction member 93 is fixed to the outer peripheral region of the disc part 92a of the piston 92 so as to be opposed to the front cover 62. When the piston 92 is axially moved and the friction member 93 is thereby pressed onto the front cover 62, a clutch-on state (a power transmitted state) is produced.

<Drive Plate 94 and Inner Peripheral Side Torsion Springs 86>

The drive plate 94 is a disc-shaped member, and the inner peripheral part thereof is fixed to that of the piston 92 by rivets 96. Additionally, the drive plate 94 has a plurality of window parts 94a bored in the outer peripheral part thereof. The plural window parts 94a respectively accommodate the inner peripheral side torsion springs 86.

<Intermediate Member 87 and Outer Peripheral Side Torsion Springs 88>

The intermediate member 87 is disposed between the piston 92 and the turbine 64, and is composed of a first plate 98 and a second plate 99. The first plate 98 and the second plate 99 are annular disc-shaped members, and are rotatable relatively to the drive plate 94 and the driven plate 89. The first plate 98 is disposed on the engine side, whereas the second plate 99 is disposed on the transmission side. The first and second plates 98 and 99 are coupled by a plurality of rivets 100 so as to be non-rotatable relatively to each other and be axially immovable.

Each of the first and second plates 98 and 99 has window parts 98a, 99a axially penetrating therethrough. Each window part 98a, 99a has a circumferentially extending shape, and has cut-and-raised parts axially cut and raised on the inner and outer peripheral parts thereof. The inner peripheral side torsion springs 86 are accommodated in the window parts 98a and 99a and the window parts 94a of the drive plate 94, and are supported by the cut-and-raised parts of the window parts 98a and 99a of the both plates 98 and 99.

The first plate 98 has a spring support part 98b having a C-shaped cross section in the outer peripheral part thereof. The outer peripheral side torsion springs 88 are supported in the interior of the spring support part 98b. Put differently, the spring support part 98b is mounted so as to cover the radially outer peripheral parts and the axially engine-side parts of the outer peripheral side torsion springs 88.

Additionally, the second plate 99 has a plurality of locking parts 99b that are formed in the outer peripheral part thereof and are bent toward the transmission. The plural locking parts 99b are circumferentially disposed at predetermined intervals, and each outer peripheral side torsion spring 88 is disposed between two of the locking parts 99b.

The intermediate member 87 constructed as described above enables the inner peripheral side torsion springs 86 and the outer peripheral side torsion springs 88 to act in a series-like manner.

<Driven Plate 89>

The driven plate 89 is an annular disc-shaped member and the inner peripheral part thereof is fixed to the flange 77a of the turbine hub 77 together with the turbine shell 75 by the rivets 78. The driven plate 89 is disposed between the intermediate member 87 and the turbine 64. Additionally, the driven plate 89 has a plurality of engaging parts 89a in the outer peripheral part thereof, and the engaging parts 89a are engaged with the both ends of the respective outer peripheral side torsion springs 88. The plural engaging parts 89a are formed by bending the outer peripheral part of the driven plate 89 toward the engine.

<Input-Side Damper Mechanism and Output-Side Damper Mechanism>

In the construction as described above, an input-side damper mechanism Di is constructed by the drive plate 94, the first and second plates 98 and 99 composing the intermediate member 87, and the plural inner peripheral side torsion springs 86. In such a construction, the drive plate 94 and the inner peripheral side torsion springs 86 are axially interposed between the first and second plates 98 and 99. The magnitude of hysteresis torque to be generated in this type of the input-side damper mechanism Di is relatively small.

On the other hand, an output-side damper mechanism Do is constructed by the outer peripheral parts of the first and second plates 98 and 99, the driven plate 89, and the plural outer peripheral side torsion springs 88. The magnitude of hysteresis torque to be generated in the output-side damper mechanism Do is larger than that of hysteresis torque to be generated in the input-side damper mechanism Di.

<Dynamic Damper Device 90>

Figure 13:
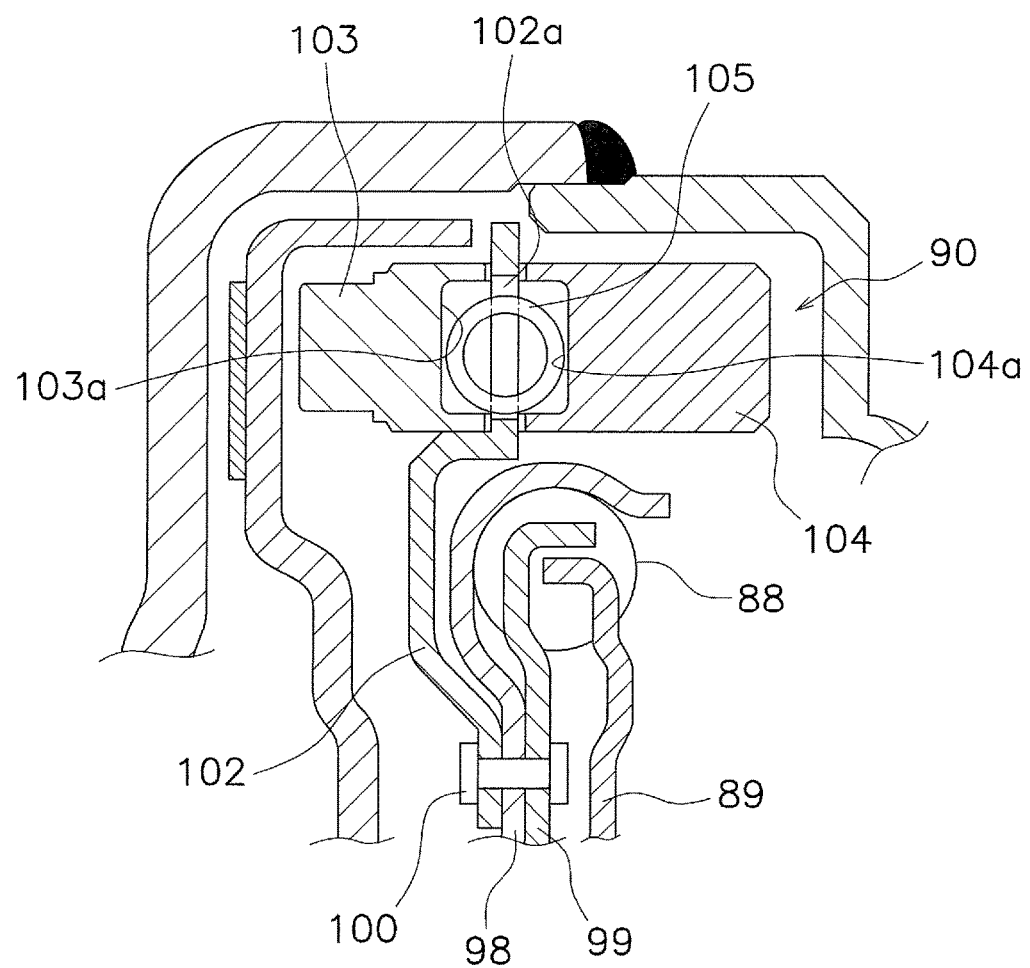
FIG. 13 is a diagram of a dynamic damper device extracted from FIG. 11.

FIG. 13 shows the dynamic damper device 90 extracted from the entire construction. The basic construction of the dynamic damper device 90 is similar to that of the dynamic damper device 34 of the first exemplary embodiment, although the dimensions and shape of the dynamic damper device 90 are different from those of the dynamic damper device 34. In short, the dynamic damper device 90 includes a damper plate 102, first and second inertia rings 103 and 104, and a plurality of coil springs (dynamic damper elastic members) 105.

Unlike the damper plate of the first exemplary embodiment, the damper plate 102 is a member provided separately from the plates 98 and 99 composing the intermediate member 87. The inner peripheral part of the damper plate 102 is fixed to the first and second plates 98 and 99 by the rivets 100. The damper plate 102 has a plurality of spring accommodating parts 102a that are circumferentially aligned at predetermined intervals. Each spring accommodating part 102a has an opening bored with a predetermined circumferential length.

The first and second inertia rings 103 and 104 are constructed similarly to their corresponding components of the first exemplary embodiment. In short, each of the both inertia rings 103 and 104 has a plurality of recesses 103a, 104a that are circumferentially aligned at predetermined intervals. The both recesses 103a and 104a are formed such that the opened parts thereof are axially opposed to each other, and the circumferential length of each recess 103a, 104a is equal to that of each opening of the damper plate 102. The coil springs 105 are respectively accommodated in accommodation spaces produced by the recesses 103a and 104a of the both inertia rings 103 and 104, and are also accommodated in the openings of the spring accommodating parts 102a of the damper plate 102.

Moreover, a construction for coupling the both inertia rings 103 and 104 is also similar to that of the first exemplary embodiment. The both inertia rings 103 and 104 are radially and axially positioned by spigot protrusions and spigot recesses, and are coupled by bolts in a condition that predetermined axial gaps are produced partially between the both inertia rings 103 and 104.

It should be noted that the first and second inertia rings 103 and 104 are disposed on the further outer peripheral side of the outer peripheral side torsion springs 88, and are also disposed such that the axial positions thereof overlap with those of the outer peripheral side torsion springs 88. Moreover, the first and second inertia rings 103 and 104 are disposed on the inner peripheral side of the outer peripheral tubular part 92c of the piston 92, and are disposed such that the radial positions thereof overlap with that of the friction member 36.

With the construction as described above, similarly to the first exemplary embodiment, the damper plate 102 and the both inertia rings 103 and 104 are rotatable relatively to each other in a predetermined angular range, with the spring accommodating parts 102a of the damper plate 102 being inserted into the gaps between the both inertia rings 103 and 104.

[Action]

The action of the torque converter body is similar to that of the first exemplary embodiment. When the speed ratio of the torque converter 60 increases and the rotational speed of the input shaft reaches a predetermined speed, the operating oil residing between the front cover 62 and the piston 92 is drained whereas the operating oil is supplied to the turbine 64 side of the piston 92. Accordingly, the piston 92 is moved toward the front cover 62. As a result, the friction member 93 fixed to the outer peripheral part of the piston 92 is pressed onto the front cover 62, and the clutch portion 85 is turned into a clutch-on state.

In the clutch-on state as described above, the torque is transmitted through a path composed of the piston 92, the drive plate 94, the inner peripheral side torsion springs 86, the intermediate member 87, the outer peripheral side torsion springs 88 and the driven plate 89 in this order, and is then outputted to the turbine hub 77.

An action of the lock-up device 67 for absorbing and attenuating variation in torque and an action of the dynamic damper device 90 are similar to those of the first exemplary embodiment, and hence, the detailed explanation thereof will not be provided. It should be noted that in the second exemplary embodiment, the float member in the first exemplary embodiment is not provided, and hence, regarding the outer peripheral side torsion springs 88, the outer peripheral side torsion springs 88 of each pair do not act in a series-like manner.

Similarly in the second exemplary embodiment, the following advantageous effects can be achieved in addition to advantageous effects similar to those achieved in the first exemplary embodiment.

(1) The first and second inertia rings 103 and 104 are disposed on the further outer peripheral side of the outer peripheral side torsion springs 88, and are located such that the axial positions thereof overlap with those of the outer peripheral side torsion springs 88. Therefore, the axial space occupied by the inertia rings 103 and 104 can be reduced, and the axial space of the entire lock-up device including the dynamic damper device 90 can be reduced.

(2) The first and second inertia rings 103 and 104 are disposed as much on the outer peripheral side as possible in the radial direction. Hence, an inertia moment by the both inertia rings 103 and 104 can be increased, and variation in rotational speed can be more effectively inhibited.

(3) The output-side damper mechanism Do, configured to generate a hysteresis torque larger than that in the input-side damper mechanism Di, is mounted on the output side of the dynamic damper device 90. Therefore, it is possible to especially enhance an effect of attenuating variation in rotational speed in the middle to high rotational speed ranges.

(4) The input-side damper mechanism Di is disposed on the inner peripheral side of the output-side damper mechanism Do. Hence, the magnitude of hysteresis torque in the output-side damper mechanism Do can be easily greater than that of hysteresis torque in the input-side damper mechanism Di.

(5) The input-side damper mechanism Di is constructed such that the drive plate 94 and the inner peripheral side torsion springs 86 are interposed and held between one pair of the plates 98 and 99. Hence, the magnitude of hysteresis torque in the input-side damper mechanism Di can be reduced.

Other Exemplary Embodiments

The present invention is not limited to the exemplary embodiments as described above, and a variety of changes or modifications can be made without departing from the scope of the present invention.

(a) In the aforementioned exemplary embodiments, the dynamic damper device is fixed to the intermediate member coupling the outer peripheral side torsion springs and the inner peripheral side torsion springs. However, the positional arrangement of the dynamic damper device is not limited to this.

For example, the dynamic damper device may be fixed to the float member for causing two outer peripheral side torsion springs of each pair to act in a series-like manner. Alternatively, the dynamic damper device may be similarly fixed to the member for causing two inner peripheral side torsion springs of each pair to act in a series-like manner. In either construction, occurrence of secondary resonance can be inhibited by disposing the torsion springs as the damper mechanism on the output side of the dynamic damper device.

(b) The construction for coupling the dynamic damper device to the intermediate member is not limited to the constructions of the aforementioned exemplary embodiments. For example, teeth or pawls may be formed on one of the intermediate member and a member composing the dynamic damper device whereas cutouts or so forth may be bored in the other of these members, and the teeth or pawls and the cutouts or so forth may be designed to be coupled to each other.

(c) In the aforementioned exemplary embodiments, the elastic members are composed of the coil springs. However, another type of elastic members made of resin or so forth may be used instead.

INDUSTRIAL APPLICABILITY

The lock-up device for a torque converter of the present invention can especially realize a lightweight construction axially occupying a small space. Additionally, in the lock-up device of the present invention, elastic members can be easily assembled to inertia rings. Furthermore, in the lock-up device of the present invention, it is possible to actuate the dynamic damper device as effectively as possible by avoiding occurrence of secondary resonance in the dynamic damper device, and it is possible to inhibit variation in rotation and thus especially achieve low fuel consumption.

REFERENCE SIGNS LIST

1, 60 Torque converter
2, 62 Front cover
4, 64 Turbine
6, 66 Torque converter body
7, 67 Lock-up device
28, 85 Clutch portion
29, 88 Outer peripheral side torsion spring
31, 87 Intermediate member
32, 86 Inner peripheral side torsion spring
33, 89 Driven plate
34, 90 Dynamic damper device
36 Clutch plate
37, 92 Piston
38 Oil chamber forming member
39, 94 Drive plate
52, 102 Damper plate
53, 103 First inertia ring
53a, 103a Recess
54, 104 Second inertia ring
54a, 104a Recess
55, 105 Coil spring (Dynamic damper elastic member)

The invention claimed is:

1. A lock-up device for a torque converter, the lock-up device disposed between a front cover coupled to an engine-side member and a torque converter body, the lock-up device configured to directly transmit a torque from the front cover to a turbine of the torque converter body, the lock-up device comprising:
a clutch portion configured to transmit the torque from the front cover to an output side;
an output rotary member rotatable relatively to the clutch portion, the output rotary member coupled to the turbine;
a plurality of torque transmission elastic members for elastically and rotation-directionally coupling the clutch portion and the output rotary member;
an intermediate member rotatable relatively to the clutch portion and the output rotary member, the intermediate member causing at least two of the plural torque transmission elastic members to act in a series-like manner; and
a dynamic damper device including a first inertia ring, a second inertia ring and a plurality of dynamic damper elastic members, the first and second inertia rings axially split and having pairs of accommodation recesses axially opposed to each other, the plural dynamic damper elastic members accommodated in the pairs of the accommodation recesses of the first and second inertia rings and elastically coupling the intermediate member and the first and second inertia rings.

2. The lock-up device recited in claim 1, wherein the plural torque transmission elastic members include
a plurality of first elastic members elastically and rotation-directionally coupling the clutch portion and the intermediate member, and
a plurality of second elastic members configured to act with the plural first elastic members in series through the intermediate member, the plural second elastic members elastically and rotation-directionally coupling the intermediate member and the output rotary member.

3. The lock-up device recited in claim 2, wherein the plural first elastic members are disposed on an outer peripheral side of the plural second elastic members.

4. The lock-up device recited in claim 2, further comprising:
a float member for causing at least two of the plural first elastic members to act in series.

5. The lock-up device recited in claim 2, wherein the plural first elastic members are disposed on an inner peripheral side of the plural second elastic members.

6. The lock-up device recited in claim 2, wherein
the dynamic damper device further includes a damper plate disposed between the intermediate member and the dynamic damper elastic members, and
the damper plate is coupled at an inner peripheral part thereof to a part of the intermediate member located radially between the first elastic members and the second elastic members, the damper plate having engaging parts on an outer peripheral part thereof, the engaging parts engaged with the dynamic damper elastic members.

7. The lock-up device recited in claim 1, wherein
the clutch portion includes
a plurality of clutch plates,
a piston for pressing the plural clutch plates against each other, and
a drive plate coupling the plural clutch plates and the plural torque transmission elastic members, and the piston is disposed in opposition to the front cover and the plural clutch plates are interposed therebetween.

8. The lock-up device recited in claim 7, further comprising:
an oil chamber forming member for forming an oil chamber together with the piston, the oil chamber disposed on an opposite side of the front cover through the piston, the oil chamber forming member rotatable in synchronization with the front cover.

9. The lock-up device recited in claim 8, further comprising:
a partition plate disposed on a torque converter body side of the clutch portion so as to be adjacent to the clutch plates.

10. The lock-up device recited in claim 9, wherein
the oil chamber forming member has a disc shape, and
the partition plate is formed by extending an outer periphery of the oil chamber forming member further radially outward.

11. The lock-up device recited in claim 1, wherein the clutch portion includes a piston disposed between the front cover and the intermediate member so as to be axially movable, the piston having a friction member on an outer peripheral part thereof, the friction member configured to be press-contacted to the front cover.

12. The lock-up device recited in claim 1, wherein the dynamic damper elastic members are springs.

13. The lock-up device recited in claim 1, wherein the dynamic damper elastic members cause a rotation of a damper plate and a rotation of the first inertia ring and second inertia ring to be displaced in phase.

14. A lock-up device for a torque converter, the lock-up device comprising:
a clutch portion that transmits a torque from a front cover to an output side, the lock-up device disposed between the front cover and a torque converter body, the front cover coupled to an engine-side member, the lock-up device to transmit the torque from the front cover to a turbine of the torque converter body;
an output rotary member that rotates relative to the clutch portion, the output rotary member coupled to the turbine;
a plurality of torque transmission elastic members that elastically and rotation-directionally couple the clutch portion and the output rotary member;
an intermediate member that rotates relative to the clutch portion and the output rotary member, the intermediate member to cause at least two of the plural torque transmission elastic members to act in series; and
a dynamic damper device including a first inertia ring, a second inertia ring and a plurality of dynamic damper elastic members, the first and second inertia rings axially split and having pairs of accommodation recesses axially opposed to each other, the plural dynamic damper elastic members accommodated in the pairs of the accommodation recesses of the first and second inertia rings and elastically coupling the intermediate member and the first and second inertia rings.

* * * * *